United States Patent [19]

Devon

[11] Patent Number: 5,546,211

[45] Date of Patent: Aug. 13, 1996

[54] METHOD AND APPARATUS FOR MULTI-PROTOCOL INFRARED DATA TRANSMISSION

[75] Inventor: Mark D. Devon, San Jose, Calif.

[73] Assignee: Apple Computer, Inc., Cupertino, Calif.

[21] Appl. No.: 490,063

[22] Filed: Jun. 13, 1995

[51] Int. Cl.$^6$ ............................................. H04B 10/00
[52] U.S. Cl. ................................... 359/154; 359/189
[58] Field of Search .......................... 359/118, 154, 359/161, 172, 189, 145, 146, 147; 364/713, 724.01; 333/167, 173–174; 455/200.1, 266

[56] References Cited

U.S. PATENT DOCUMENTS

| | | | |
|---|---|---|---|
| 5,303,413 | 4/1994 | Braegas | 455/266 |
| 5,339,455 | 8/1994 | Vogt et al. | 455/266 |
| 5,469,288 | 11/1995 | Onaka et al. | 359/189 |

*Primary Examiner*—Leo Boudreau
*Assistant Examiner*—Kinfe-Michael Negash
*Attorney, Agent, or Firm*—Blakely, Sokoloff, Taylor & Zafman

[57] ABSTRACT

A method and apparatus for receiving data carried on an infrared signal that has been encoded using one of a plurality of protocols is provided. The apparatus includes a mechanism for detecting the infrared signal and producing an electrical signal based on the infrared signal. The electrical signal is then applied to a high frequency path and a low frequency path. The high frequency path contains circuitry for filtering the low frequency components of the electrical signal. The low frequency path contains circuitry for filtering the high frequency components of the signal. Analog filters are disposed along one or both of the signal paths. Digital logic selects one of the signal paths and activates the appropriate analog filter based on a selected protocol. A mechanism is also provided for automatically sensing the protocol that has been used to encode the infrared signal.

23 Claims, 4 Drawing Sheets

METHOD AND APPARATUS FOR MULTI-PROTOCOL INFRARED DATA TRANSMISSION

FIELD OF THE INVENTION

The present invention relates to infrared data communications, and more specifically, to a method and apparatus for receiving, over an infrared light signal, data that is encoded according to any one of a variety of protocols.

BACKGROUND OF THE INVENTION

Wireless technologies have been developed to replace manual connections between devices with radio frequency (RF) signals, infra-red signals, ultrasonic signals and near field signals. Through the use of wireless technologies, portable computers can easily "connect" into a network simply by being placed in proximity to a device that supports the wireless communication that is already part of the network.

Each type of wireless technology has its own set of characteristics. For example, ultrasound networks tend to have very low data rates. In contrast, radio frequency (RF) networks provide relatively high data rates (10s of Megabits per second) over relatively long distances (hundreds of feet). RF networks have the disadvantage that RF technology tends to be the most expensive wireless technology. In addition, RF networks are subject to government regulations which vary substantially from one country to the next.

Infrared (IR) connections typically fall into one of two categories. The first category of IR connection is a low cost, short range (a few feet), line-of-sight connection between two IR capable devices. The second category of IR connection is a higher cost, longer range (30–40 feet), diffuse, omnidirectional connection between IR capable devices. Infra-red systems have advantages over RF systems in that data transmitted over IR signals is relatively secure, and IR is generally cheaper than wireless radio links.

Using IR technology, a point-to-point connection between two devices may be constructed for very low cost, with one or two emitter LEDs. If more range is desired, infrared emitters may be added to increase signal strength, at the expense of increased power requirements and cost. Diffuse systems, which have the largest expanse of range, may require up to 10 emitters to fully cover a room.

Numerous modulation methods have been developed for transmitting data using infrared signals. Modulation methods that are currently in commercial use include baseband pulsing, frequency shift keying (FSK), amplitude shift keying (ASK), phase shift keying (PSK), pulse position modulation (PPM) and burst-PPM. Each of these modulation methods involves tradeoffs between cost, signal distance, signal rate and ambient immunity. Ambient immunity, as the term is used herein, is the ability to receive information sent over infrared signals while rejecting ambient sources of light. Ambient sources of light include, for example, sunlight, fluorescent lighting and incandescent lighting.

Baseband pulsing is typically less complex, and therefore less expensive than the other popular methods, but provides less ambient immunity and distance. Receivers for baseband pulsing can be as simple as a photodiode amplifier and a comparator.

ASK, FSK and PSK systems, on the other hand, typically cost more than baseband pulsing systems. The receivers of these types of systems generally require hardware that is more complex than the hardware required by baseband pulsing systems. Specifically, ASK typically requires a tank circuit and peak detector. FSK typically requires a quadrature frequency discriminator. PSK typically requires PLL based receivers. While ASK, FSK and PSK systems are more expensive than baseband pulsing systems, these systems also tend to have superior ambient immunity.

PPM is used in longer distance diffuse systems, where it is desired to project the maximum light output at the expense of a more complicated transmitter and receiver. For the reception of rectangular pulses, PPM may use a phase locked gated integrator to maximize the signal to noise ratio at the receiver. PPM also has inherent signal to noise advantages over constant carrier schemes. Like baseband systems, PPM systems show poor ambient rejection at low data rates. The ambient rejection improves as the data rate increases to a rate much higher than the ambient. This result occurs because filters may be used to block low frequency interference with relatively minor amplitude and phase distortion of the received signal.

In the design of a particular infrared device, cost, ambient immunity, distance, and data rate are all factors used to determine the appropriate protocol. Once a protocol is selected, the device is designed with an emitter and/or receiver that supports the selected protocol. In general, infrared devices that support one protocol cannot communicate with infrared devices that support different protocols. Therefore, most infrared devices can only communicate with a relatively small subset of other infrared devices.

Based on the foregoing, it is clearly desirable to provide a method and apparatus that allows an infrared device to communicate with a wider selection of infrared devices. It is further desirable to provide an infrared device that is capable of decoding signals from infrared devices that support different protocols.

SUMMARY OF THE INVENTION

A method and apparatus for receiving data carded on an infrared signal that has been encoded using one of a plurality of protocols is provided. The apparatus includes a mechanism for detecting the infrared signal and producing an electrical signal based on the infrared signal. The electrical signal is amplified and divided between a high frequency path and a low frequency path. The high frequency path contains circuitry for filtering out the low frequency components of the electrical signal. The low frequency path contains circuitry for filtering out the high frequency components of the signal. Analog filters are disposed along one or both of the signal paths. Digital logic selects one of the signal paths and activates the appropriate analog filter based on a selected protocol. A mechanism is also provided for automatically sensing the protocol that has been used to encode the infrared signal.

According to one aspect of the invention, a method for decoding information carried on an infrared signal is provided. According to the method, an input signal corresponding to the infrared signal is received. A plurality of filters are provided. Each filter corresponds to one of a plurality of protocols. A protocol is selected from the plurality of protocols. The filter that corresponds to the selected protocol is activated. The input signal is filtered to produce the desired passband for each protocol. The filtered signal is decoded according to the selected protocol.

According to one embodiment, the plurality of filters are analog filters. The analog filters may be, for example, circuits configured to filter out signal components that fall outside a frequency range that corresponds to the selected protocol. The filtered signal may also be filtered additionally by a digital filter that corresponds to the selected protocol after being filtered by the selected analog filter.

According to another aspect of the invention, the method may also include a step of automatically determining the protocol of the infrared signal. According to one embodiment, the protocol is determined by selecting a current protocol, activating the filter associated with the current protocol, and determining whether the filtered signal includes valid data. If the filtered signal includes valid data, then it is determined that the current protocol is the protocol of the infrared signal. If the filtered signal does not include valid data, then a different protocol is selected as the current protocol and the above-enumerated steps are repeated.

According to another aspect of the invention, an apparatus for decoding an infrared signal is provided. The apparatus includes a signal reception unit, a plurality of filters, a protocol selection unit, a filter selection unit and a signal decoder.

The signal reception unit detects the infrared signal and generates an input signal to the filter bank based on the infrared signal. Each filter of the plurality of filters corresponds to an individual protocol from a plurality of protocols. The protocol selection unit selects a selected protocol of the plurality of protocols.

The filter selection unit is coupled to the protocol selection unit and to the plurality of filters. The filter selection unit activates the filter of the plurality of filters that corresponds to the selected protocol. The filter that corresponds to the selected protocol filters the input signal to produce a filtered signal. The signal decoder decodes the filtered signal.

A computer system in which devices communicate using one of a plurality of protocols is also provided. One or more of the devices in the computer system transmits an infrared light signal that contains information encoded according to a particular protocol. Another device in the computer system contains the apparatus for decoding infrared signals described above. The protocol selection unit selects from among a plurality of protocols the protocol that is being used to encode the information in the infrared signal. The signal is filtered and decoded based on the selected protocol.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Multiple Encoding Schemes

Figure 1:
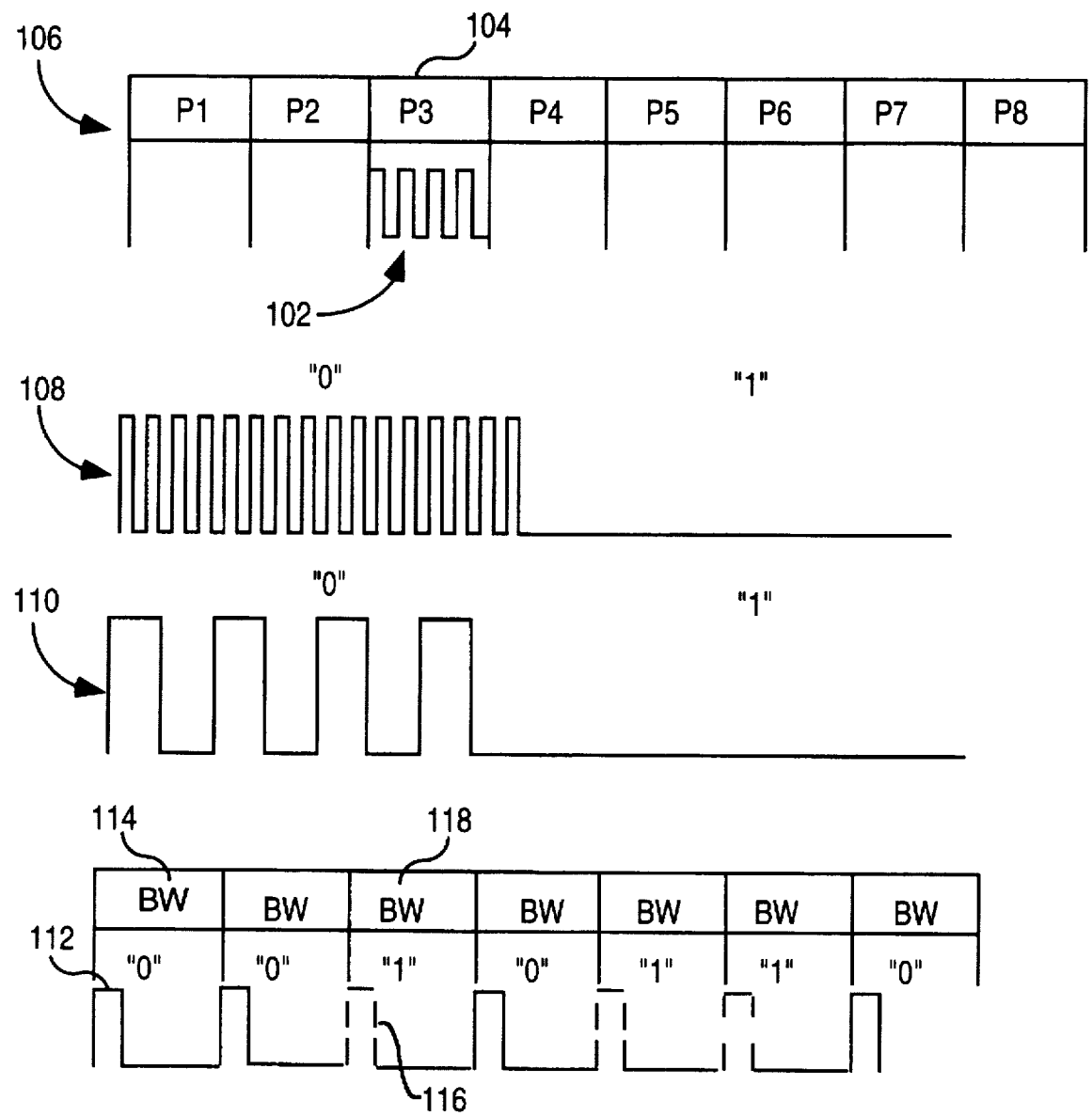
FIG. 1 illustrates various encoding schemes for encoding data for infrared transmission.

FIG. 1 illustrates examples of various schemes for encoding data in infrared signals. According to pulse position modulation (PPM), symbols are mapped to pulse positions. To transmit a signal representing a particular symbol, a tone burst 102 is generated during the pulse position that corresponds to the symbol. In the illustrated example, the tone burst 102 is generated during the third pulse position 104 of an eight position pulse position modulation frame 106. U.S. patent application Ser. No. 08/433,709 entitled "Method and Apparatus for Multi-Mode Infrared Data Transmission" filed by Devon et al. on May 2, 1995 describes a PPM modulation scheme in which symbols are encoded based on both pulse position and tone burst frequency.

In ASK, a binary "0" is represented by the generation of a series of pulses during a particular time period. A binary "1" is represented by the absence of pulses during a particular time period. Certain Personal Digital Assistants, such as the Newton™ produced by Apple Computer, Inc., encode data using 500 kHz ASK infrared signals, as shown at 108. Many television remote controls use 40 kHz ASK infrared signals, as shown at 110.

In baseband, a pulse 112 is sent during a bit window 114 to represent a binary "0". The absence of a pulse 116 during a bit window 118 represents a binary "1". According to the IRDA specification, the pulse has a duration of 1.6 microseconds.

Figure 2:
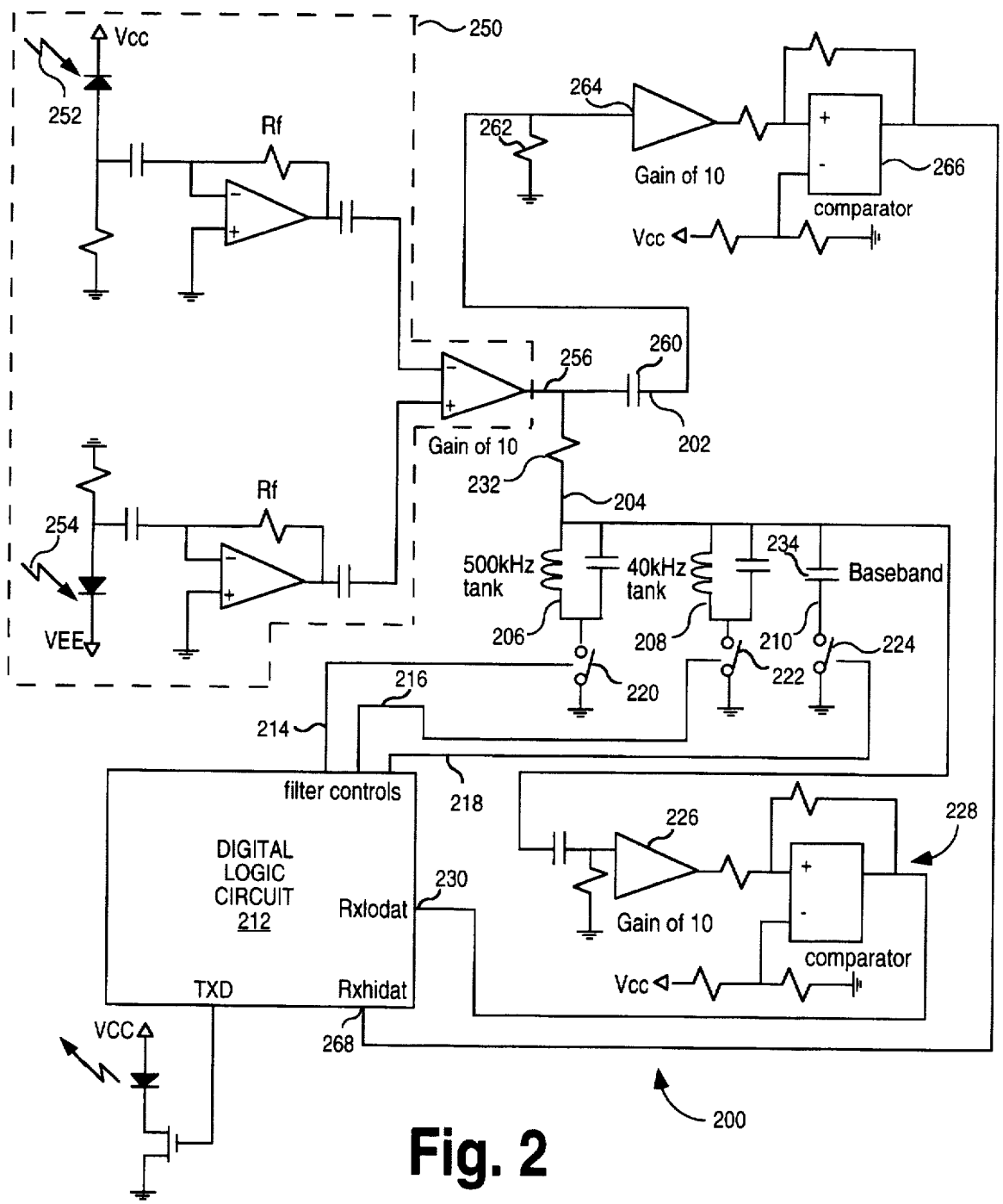
FIG. 2 is a schematic diagram that illustrates a multi-protocol infrared receiver according to one embodiment of the invention.

The present invention provides a single receiver for use with multiple encoding schemes. FIG. 2 illustrates an embodiment of the invention for use with the four encoding schemes described in FIG. 1. However, these encoding schemes are merely discussed for the purpose of explanation. The present invention is not limited to any particular set of schemes for encoding data in infrared transmissions.

Multiple Protocol Receiver

Referring to FIG. 2, it is a schematic diagram of a multi-protocol infrared receiver 200 according to one embodiment of the invention. Receiver 200 has a signal detection unit 250 for receiving two differentially opposed infrared signals 252 and 254. Signal detection unit 250 amplifies and combines the infrared signals 252 and 254 to produce the input signal on line 256.

Receiver 200 has a high frequency path 202 and a low frequency path 204. A capacitor 260 and resistor 262 disposed along the high frequency path 202 serve as a high pass filter to prevent the lower frequency components of the input signal from passing through to amplifier 264. The high frequency components of the input signal are amplified by amplifier 264 and digitized by analog to digital converter 266. The resulting signal is applied to an input 268 of a digital logic circuit 212.

The infrared signals used in high frequency pulse position modulation, such as that shown as tone burst 102 of FIG. 1, typically have a higher frequency than the infrared signals used by the other encoding schemes. Therefore, the digital signal that arrives at input 268 will represent data sent using high frequency PPM encoding. On the other hand, if the input signal is encoded using a lower frequency encoding scheme, the signal at input 268 will not reflect valid data.

The lower frequency components of the input signal pass through to the low frequency path 204 and are selectively filtered. Specifically, a plurality of analog filters 206, 208 and 210 are disposed along the low frequency path 204. Each of the analog filters 206, 208 and 210 corresponds to a protocol and is configured to filter out signals that do not have the frequency expected by the corresponding protocol.

Each of analog filters 206, 208 and 210 are configured to pass a narrow bandwidth of the input signal. For example, analog filter 206 is a tank circuit that has a large impedance for those components of the input signal that are at the resonant frequency associated with the tank circuit (i.e. 500 kHz). Such signal components will therefore pass through analog filter 206 with little attenuation. The larger the difference between the frequency of a signal component and the resonant frequency of the tank circuit, the lower the impedance of the tank circuit with respect to that signal component and the greater the attenuation of that component of the input signal. Thus, the signal that ultimately arrives at amplifier 226 will largely reflect only those components of the input signal that have the approximate frequency associated with the currently-active filter. These components are amplified by amplifier 226, digitized by an analog to digital conversion circuit 228 and ultimately applied to an input 230 of digital logic circuit.

In the illustrated example, analog filter 206 is a 500 kHz tank circuit that allows signals that have a frequency of approximately 500 kHz to pass through to amplifier 226. Thus, a user would activate analog filter 206 to receive the 500 kHz ASK signal 108 illustrated in FIG. 1. Analog filter 208 is similar to analog filter 206 except that the resonant frequency of analog filter 208 is 40 kHz. Consequently, a user would activate analog filter 208 to receive the 40 kHz signal 110 illustrated in FIG. 1. Analog filter 210 is a low pass filter that allows only those signal components with frequencies below the RC frequency determined by resistor 232 and capacitor 234 to pass to amplifier 226. Such a filter would allow baseband pulses, such as pulse 112 of FIG. 1, to pass through to amplifier 226.

A user activates one of analog filters 206, 208 and 210 based on the protocol of signal the user expects to receive. The user activates the appropriate analog filter by causing a digital logic circuit 212 to transmit control signals over lines 214, 216 and 218 to control switches 220, 222 and 224 that are associated with analog filters 206, 208 and 210. For example, to activate analog filter 206 digital logic circuit 212 transmits a signal over line 214 to close switch 220, and signals on lines 216 and 218 to open switches 222 and 224.

Protocol Detection

Figure 3:
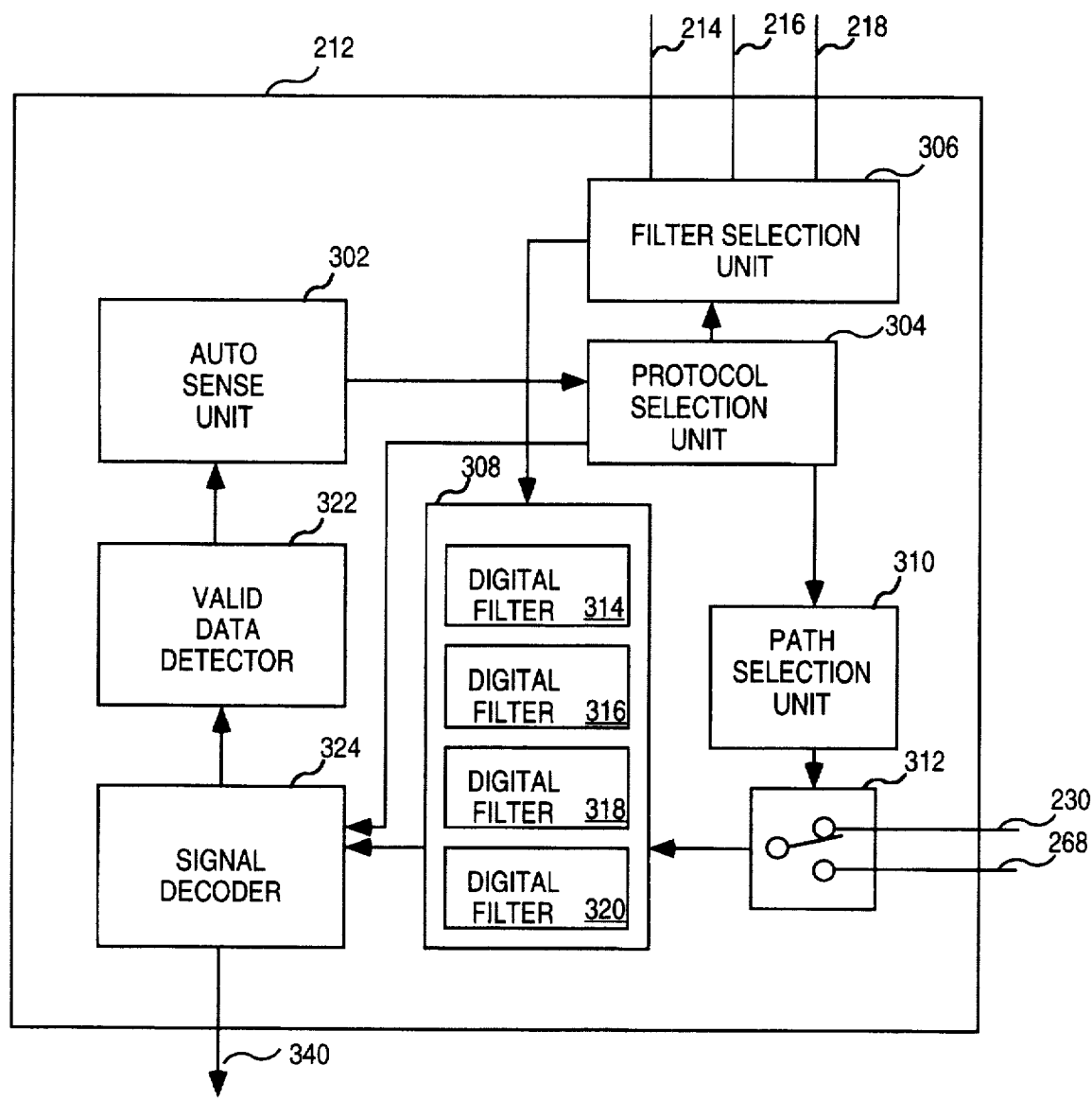
FIG. 3 is a functional block diagram illustrating the digital logic circuit of FIG. 2 in greater detail.

According to one embodiment of the invention, digital logic circuit 212 is configured to automatically detect the protocol of an incoming signal. Referring to FIG. 3, it illustrates a functional block diagram of digital logic circuit 212 according to an embodiment of the invention. Digital logic circuit 212 generally includes an auto-sense unit 302, a valid data detector 322, a signal decoder 324, a digital filter unit 308 and a filter selection unit 306. Digital logic circuit 212 also includes a protocol selection unit 304, a path selection unit 310 and a switch 312.

Digital filter unit 308 contains a plurality of digital filters 314, 316, 318 and 320. Each of digital filters 314, 316, 318 and 320 corresponds to a protocol supported by receiver 200. For the purposes of explanation, it shall be assumed that digital filter 314 corresponds to high frequency pulse position modulation, digital filter 316 corresponds to 500 kHz ASK, digital filter 318 corresponds to 40 kHz ASK, and digital filter 320 corresponds to baseband encoding.

To detect the protocol of an incoming signal, auto sense unit 302 sequentially attempts to detect data at each supported frequency. Specifically, auto sense unit 302 transmits a control signal to protocol selection unit 304 to select a first protocol. Protocol selection unit 304 transmits signals to filter selection unit 306 and to path selection unit 310 indicating the filter and signal path that corresponds to the selected protocol.

Filter selection circuit 306 transmits control signals over lines 214, 216 and 218 to activate the analog filter associated with the selected protocol, as described above. In addition, filter selection unit 306 transmits a signal to digital filter unit 308 to select the digital filter that corresponds to the selected protocol.

Path selection unit 310 transmits a control signal to switch 312 to cause digital filter unit 308 to receive the signal from the path associated with the selected protocol. In the present example, digital filter unit 308 would receive the signal at input 268 for high frequency PPM, and would receive the signal at input 230 for all other protocols.

The selected digital filter receives and filters the incoming signal to produce a digitally filtered signal. The digitally filtered signal is received by signal decoder 324 which decodes the signal according to the selected protocol. If there is no incoming signal, or if the incoming signal was sent using a protocol other than the selected protocol, then the signal received by signal decoder 324 will not contain valid data. Valid data detector 322 detects whether the decoded signal represents valid data, and transmits a control signal to auto sense unit 302 that indicates whether valid data was detected.

If no valid data was detected during a monitoring period of a predetermined length, auto sense unit 302 transmits a signal to protocol selection unit 304 to select a second protocol. The incoming signal is monitored as described above for a second monitoring period. If valid data is not detected during the second monitoring period, a third protocol is selected. This process is repeated until valid data is detected or all supported protocols have been tested.

Once valid data is detected, then the currently active analog filter remains active while the incoming signal is received and decoded. The decoded information may be sent for processing to a processor or other circuitry over a line 340. Any infrared signals transmitted by the device containing receiver 200 would be encoded using the protocol that corresponds with the active analog filter. If valid data is not detected at any frequency, then the device containing receiver 200 transmits information using a default protocol.

FIG. 3 has been described with reference to functional units. These units may be implemented by programming one or more processors. In addition, some or all of the units may be separately implemented using hard-wired circuitry. The present invention is not limited to any specific implementation of the functional units contained in digital logic circuit 212.

Figure 4:
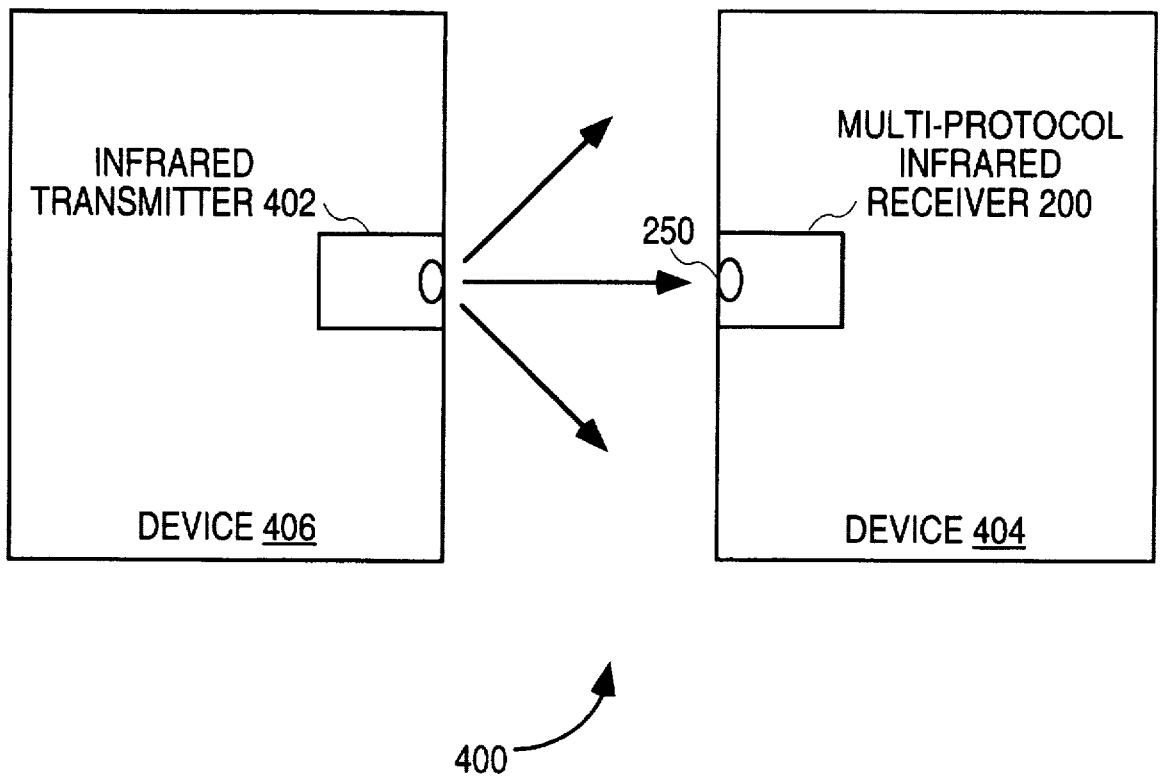
FIG. 4 is a block diagram illustrating a computer system that includes a device with an infrared transmitter and a device with a multi-protocol infrared receiver according to an embodiment of the invention.

FIG. 4 is a block diagram illustrating a computer system 400 that includes a device 406 with an infrared transmitter 402 and a device 404 that includes multi-protocol infrared receiver 200. Devices 406 and 404 communicate using one of a plurality of protocols. Specifically, device 406 causes infrared transmitter 402 to transmit an infrared light signal that contains information encoded according to a particular protocol. Device 404 contains multi-protocol infrared receiver 200 that includes a signal detection unit 250 for receiving the infrared signal sent by transmitter 402 and circuitry for decoding infrared signals, as described above. The protocol selection unit within multi-protocol infrared receiver 200 selects from among a plurality of protocols the protocol that is being used to encode the information in the infrared signal. Device 404 filters and decodes the signal based on the selected protocol.

While specific embodiments of the present invention have been described, various modifications and substitutions will become apparent by this disclosure. Such modifications and substitutions are within the scope of the present invention, and are intended to be covered by the following claims.

What is claimed is:

1. A method for decoding information carried on an infrared signal, the method comprising the steps of:

receiving an input signal corresponding to said infrared signal;

providing a plurality of filters, wherein each filter of said plurality of filters corresponds to one of a plurality of protocols;

selecting a selected protocol from said plurality of protocols;

activating a filter of said plurality of filters, said filter being the filter that corresponds to said selected protocol;

filtering said input signal with said filter to produce a filtered signal; and decoding said filtered signal according to said selected protocol.

2. The method of claim 1 wherein:

said step of providing a plurality of filters includes providing a plurality of analog filters;

said step of activating a filter includes the step of activating an analog filter of said plurality of analog filters;

said step of filtering said input signal includes the step of filtering said input signal with said analog filter.

3. The method of claim 1 wherein said step of providing a plurality of filters includes providing a plurality of filters that correspond to a plurality of frequency ranges, wherein each filter of said plurality of filters corresponds to a corresponding frequency range of said plurality of frequency ranges, wherein each filter is configured to filter out components of said input signal that do not fall within said corresponding frequency range.

4. The method of claim 1 further comprising the step of automatically determining a protocol of the infrared signal.

5. The method of claim 4 wherein said step of automatically determining a protocol includes the steps of:

a) selecting a current protocol of said plurality of protocols;

b) activating the filter associated with said current protocol;

c) determining whether said filtered signal includes valid data;

d) if said filtered signal includes valid data, then determining that the current protocol is the protocol of the infrared signal; and e) if said filtered signal does not include valid data, then selecting a different protocol of said plurality of protocols as said current protocol and repeating steps b) through d).

6. The method of claim 2 wherein said step of providing a plurality of filters includes providing a plurality of digital filters;

said step of activating a filter includes the step of activating a digital filter of said plurality of analog filters; and said step of filtering said input signal includes the step of filtering said input signal with said digital filter after filtering said input signal with said analog filter.

7. The method of claim 1 wherein:

said step of receiving said input signal comprises the step of receiving said input signal on a first line;

the method further comprises the steps of:

providing a high frequency data path and a low frequency data path coupled to said first line;

filtering low frequency components of said input signal from said high frequency data path;

selecting a selected path of said high frequency data path and said low frequency data path based on said selected protocol; and said step of filtering said input signal comprises filtering a signal carried on said selected path.

8. An apparatus for decoding an infrared signal, comprising:

a signal reception unit for detecting said infrared signal and generating an input signal based on said infrared signal;

a plurality of filters, wherein each filter of said plurality of filters corresponds to a protocol of a plurality of protocols;

a protocol selection unit for selecting a selected protocol of said plurality of protocols;

a filter selection unit coupled to said protocol selection unit and to said plurality of filters;

wherein said filter selection unit activates the filter of said plurality of filters that corresponds to said selected protocol;

wherein said filter that corresponds to said selected protocol filters said input signal to produce a filtered signal; and a signal decoder for decoding said filtered signal.

9. The apparatus of claim 8 further comprising:

a signal path that carries said input signal, wherein said signal path branches into a high frequency signal path and a low frequency signal path;

a switch for selecting between said high frequency signal path and said low frequency signal path; and a path selection unit coupled to said protocol selection unit and to said switch, said path selection unit controlling said switch based on said selected protocol.

10. The apparatus of claim 8 further comprising:

a valid data detector for determining whether said filtered signal carries valid data; and an auto sense unit coupled to said protocol selection unit and said valid data detector, said auto sense unit causing said protocol selection unit to sequentially select each of said plurality of protocols until said valid data detector determines that said filtered signal carries valid data.

11. The apparatus of claim 10 wherein said auto sense unit ceases to cause said protocol selection unit to sequentially select each of said plurality of protocols when each of said plurality of protocols has been selected at least once.

12. The apparatus of claim 8 wherein:

said plurality of filters include a plurality of analog filters and a plurality of digital filters;

each protocol of said plurality of protocols has a corresponding analog filter of said plurality of analog filters and a corresponding digital filter of said plurality of digital filters;

said filter selection unit is configured to activate said analog filter that corresponds to said selected protocol and to activate said digital filter that corresponds to said selected protocol;

said input signal is filtered by both said analog filter and said digital filter.

13. The apparatus of claim 12 wherein said input signal is filtered by said analog filter prior to being filtered by said digital filter.

14. The apparatus of claim 8 wherein at least one of said plurality of filters is a tank circuit.

15. The apparatus of claim 8 wherein each of said plurality of filters is configured to filter out signal components that fall outside a frequency range associated with the filter.

16. A computer system in which a plurality of devices communicate with each other using infrared light, the computer system comprising:

a first device having an infrared transmitter, said infrared transmitter transmitting an infrared signal that encodes information according to a particular protocol;

a second device containing an apparatus for decoding said infrared signal, the apparatus comprising:

a signal reception unit for detecting said infrared signal and generating an input signal based on said infrared signal;

a plurality of filters, wherein each filter of said plurality of filters corresponds to a protocol of a plurality of protocols, said plurality of protocols including said particular protocol;

a protocol selection unit for selecting as a selected protocol said particular protocol from said plurality of protocols;

a filter selection unit coupled to said protocol selection unit and to said plurality of filters;

wherein said filter selection unit activates the filter of said plurality of filters that corresponds to said selected protocol;

wherein said filter that corresponds to said selected protocol filters said input signal to produce a filtered signal; and a signal decoder for decoding said filtered signal.

17. The computer system of claim 16 wherein the apparatus further comprises:

a signal path that carries said input signal, wherein said signal path branches into a high frequency signal path and a low frequency signal path;

a switch for selecting between said high frequency signal path and said low frequency signal path; and a path selection unit coupled to said protocol selection unit and to said switch, said path selection unit controlling said switch based on said selected protocol.

18. The computer system of claim 16 wherein the apparatus further comprises:

a valid data detector for determining whether said filtered signal carries valid data; and an auto sense unit coupled to said protocol selection unit and said valid data detector, said auto sense unit causing said protocol selection unit to sequentially select each of said plurality of protocols until said valid data detector determines that said filtered signal carries valid data.

19. The computer system of claim 18 wherein said auto sense unit ceases to cause said protocol selection unit to sequentially select each of said plurality of protocols when each of said plurality of protocols has been selected at least once.

20. The computer system of claim 16 wherein:

said plurality of filters include a plurality of analog filters and a plurality of digital filters;

each protocol of said plurality of protocols has a corresponding analog filter of said plurality of analog filters and a corresponding digital filter of said plurality of digital filters;

said filter selection unit is configured to activate said analog filter that corresponds to said selected protocol and to activate said digital filter that corresponds to said selected protocol;

said input signal is filtered by both said analog filter and said digital filter.

21. The computer system of claim 20 wherein said input signal is filtered by said analog filter prior to being filtered by said digital filter.

22. The computer system of claim 16 wherein at least one of said plurality of filters is a tank circuit.

23. The computer system of claim 16 wherein each of said plurality of filters is configured to filter out signal components that fall outside a frequency range associated with the filter.

* * * * *